Aug. 28, 1951  R. A. KOERTGE ET AL  2,565,732
GRAVITY TIRE AND WHEEL BALANCER
Filed Aug. 14, 1946  3 Sheets-Sheet 1

INVENTORS
RAY A. KOERTGE &
GEORGE E. PRESTON
BY
Robert A Sloman
ATTORNEY

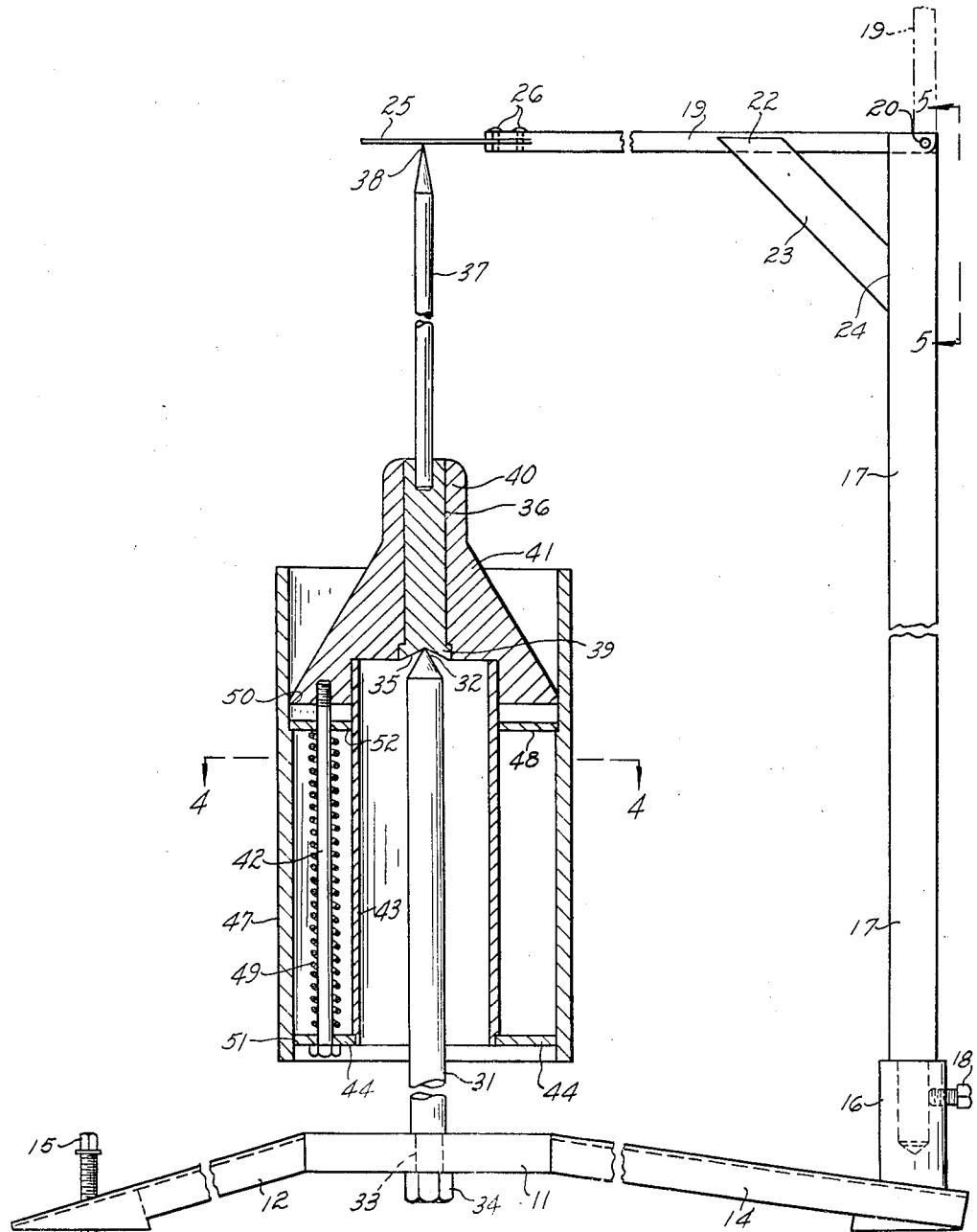

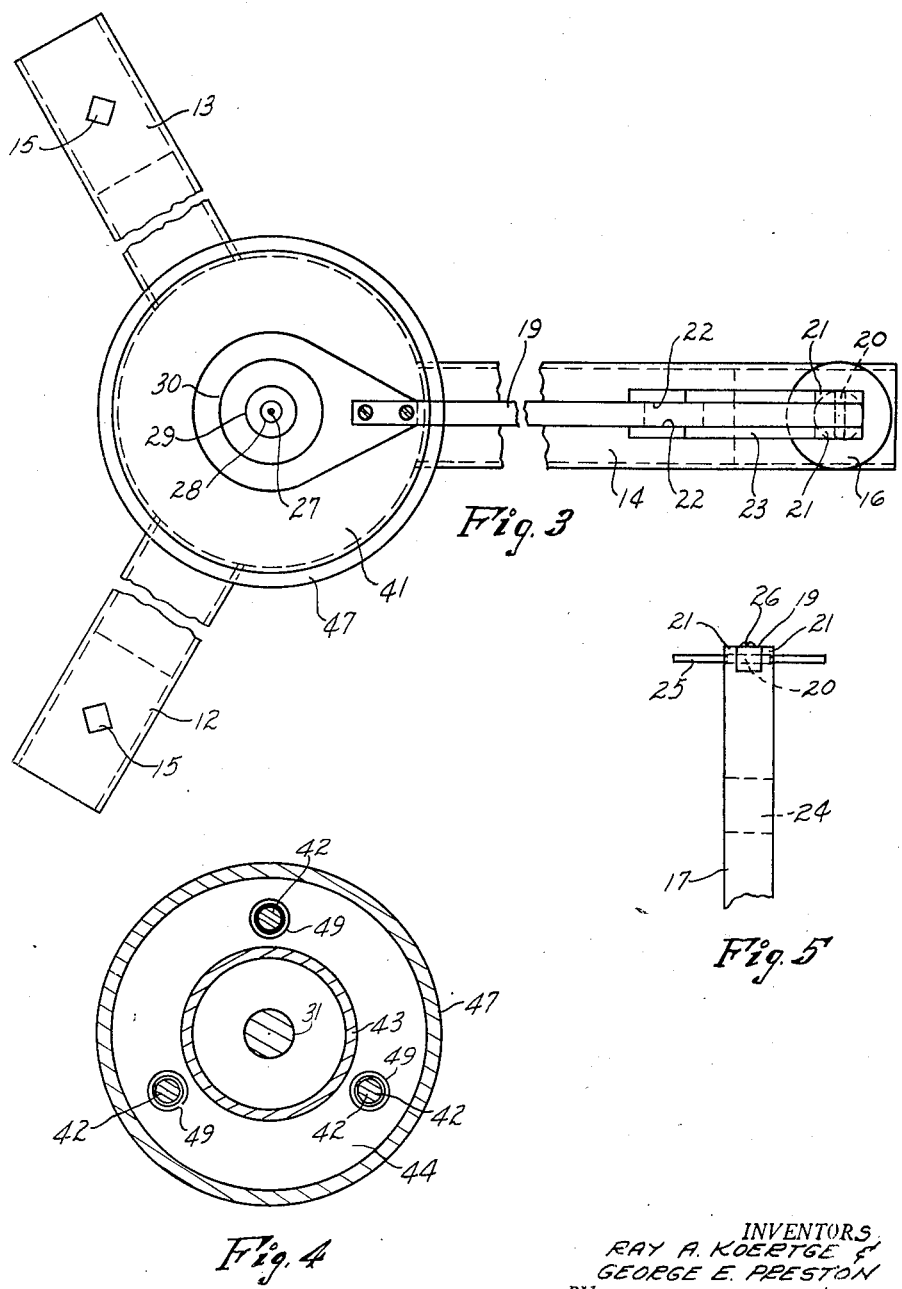

Patented Aug. 28, 1951

2,565,732

UNITED STATES PATENT OFFICE 2,565,732

GRAVITY TIRE AND WHEEL BALANCER

Ray A. Koertge, Detroit, and George E. Preston, Highland Park, Mich., assignors to Dorris S. Beckett and Lyle C. Williams, both of Lincoln Park, Mich.

Application August 14, 1946, Serial No. 690,412

2 Claims. (Cl. 73—66)

This invention relates to a balancing mechanism for any annular object, and more particularly to a gravity tire and wheel balancer.

It is the object of the present invention to provide an accurate means for ascertaining the extent of unbalance of a tire and wheel, or any other annular object, and the radial location of said unbalance throughout the three hundred sixty degrees of the periphery of the wheel flange or other annular object.

It is the object of this invention to ascertain what weight must be secured to the wheel flange to correctly balance a tire and wheel bringing its center of gravity to the geometric center of said wheel.

It is also the object of this invention to accurately ascertain the necessary angular positioning of said weight upon the periphery of said wheel flange to correctly balance a tire and wheel.

It is the still further object of this invention to provide a very accurate visual means for determining the balancing weight required and its angular positioning at the periphery of the wheel flange.

These and other objects will be seen from the following specification and claims in conjunction with the appended drawings in which;

Fig. 2 is a side elevational view of the tire and wheel balancer with the balancing mechanism shown in section.

Fig. 3 is a top plan view thereof.

Fig. 4 is a section on line 4—4 of Figure 2; and

Fig. 5 is a fragmentary elevational view on line 5—5 of Figure 2.

Figure 1:
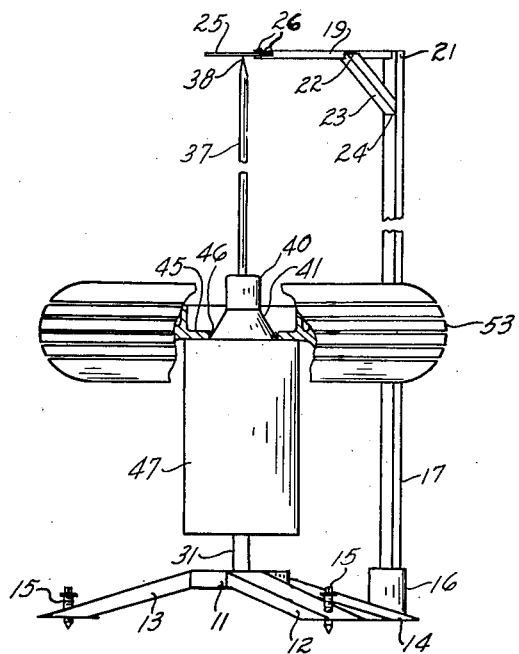
Fig. 1 is a front perspective view of the tire and wheel balancer with the tire and wheel mounted thereon and broken away to show the positioning of the wheel flange thereon.

It will be understood that the above drawings illustrate merely one preferable embodiment of the invention, and that other embodiments are contemplated within the scope of the claims hereafter set out.

Referring to the drawings, Figures 1, 2 and 3 the tire and wheel balancer consists of a circular platform base 11 with the three angularly arranged extending supporting legs 12, 13 and 14, secured thereto, preferably constructed of channeled iron for rigidity.

Supporting screws 15 adjustably extend through front legs 12 and 13 thereby providing an adjustable support for base 11 for properly leveling the same in the manner and for the purpose hereafter set out.

Upright support 16 is suitably secured as by welding upon the outer end of leg 14 and has a central opening therein for receiving the target supporting shaft 17, which is retained in position by threaded set screw 18, Figure 2.

Target supporting arm 19 is pivotally mounted at one end on the pin 20 between the upper bifurcated portion 21 of shaft 17. Arm 19 is supported in horizontal position within the slotted portion 22 in the upper end of stationary arm 23 which is angularly arranged and preferably welded at its lower end at points 24 to the side of shaft 17.

The outer free end of arm 19 is slotted to removably receive the plastic or otherwise transparent target 25 which is secured in position by screws 26. Target 25 has a central indicating bull's-eye 27 and a plurality of concentric indicating circles 28, 29 and 30 printed or otherwise formed thereon.

The wheel balancing mechanism consists of a hardened preferably tool steel shaft 31 which has a conical portion at its upper end terminating in the point 32. Its lower end 33 is formed of a reduced diameter and projects through a corresponding central opening in platform 11, and is secured thereto by the nut 34 which threadably engages the lower end of shaft 31, on the under side of said platform.

Balancing shaft 31 is thus rigidly supported in upright position upon base 11, and its upper pointed end 32 projects operatively into the apex of the conical opening 35 formed in the central balancing shaft 36. The latter preferably constructed of hardened tool steel carries the upwardly projecting indicating pointer 37 having a point 38 within a central opening in its upper end.

Shaft 36 has an annularly flanged shoulder 39 in its lower end and carries the wheel supporting member 40 through which it is centrally projected and immovably secured. Member 40 is cylindrical at its upper end with its lower wheel supporting portion 41 being conical in form of increasing diameter to adjustably accommodate varying sized openings in the wheel to be balanced as indicated in Figure 1.

As illustrated in Figures 2 and 4 there are preferably 3 elongated bolts 42 which threadably engage member 40 and depend downwardly therefrom. Hollow cylindrical shell 43 is centrally secured at its upper end within a corresponding opening in the bottom of member 40 and projects downwardly therefrom as shown in Figure 2.

Hollow lower guide disc 44 is suitably secured to the lower end of cylindrical member 43, and bolts 42 project through corresponding openings therein. It is thus seen that disc 44, cylinder 43, and bolts 42 are immoveably secured to the wheel supporting member 40 for tilting movement therewith upon its point support 32.

Referring to Figure 1 the wheel flange 45 has a central hub opening 46 the inner walls of which are adapted to aligningly engage the conical portion 41 of member 40. It will be readily seen as this central opening will vary in diameter with the different sizes of wheels that the wheel will drop over member 41 and selectively rest on the outer portion thereof corresponding to its diameter.

The wheel flange 45 is also supported upon the resiliently mounted hollow cylindrical self-aligning member 47. The latter has secured thereto at its inner diameter the upper hollow guide disc 48 through which bolts 42 slidably project.

Coil springs 49 are mounted around bolts 42 and interposed between the two discs 44 and 48. Said springs carried by disc 44 thus act as a self-aligning resilient support for upper disc 48 and the cylindrical wheel support 47 which is secured thereto.

Wheel support 47 thus slidably engages the lower outer end 50 of member 40 and also the outer edge 51 of lower guide disc 44 carried by member 40. It will be seen further that upper disc 48 also slidably engages the outer wall of cylindrical shell 43 at points 52.

Outer wheel supporting cylinder 47 is thus adapted to vertical sliding movement relative to member 40 and is guidingly engaged at points 50, 51 and 52, which in each case are actually circular lines of engagement.

Member 47 thus floats on self-aligning springs 49 which take some of the weight of the wheel and tire 45—53 as the wheel flange 45 moves downwardly relative to conical support 41 until the walls of its central opening 46 are supportingly engaged by member 41 as illustrated in Figure 1.

*Operation*

Before the wheel 45 and its tire 53 are mounted upon the balancing device, the balancer is set in the position shown in Figure 2 with arm 19 in its horizontal operative position.

It is necessary to now properly align the point 38 of pointer 37 with the bull's-eye 27 on target 25. This is accomplished by manual adjustment of screws 15 in legs 12 and 13.

When the pointer 37 is properly set, arm 19 is pivoted upwardly around its pivotal support 20 to a vertical position as indicated fragmentarily in dotted lines in Figure 2.

The wheel and tire 45—53 is then centrally positioned over pointer 37 and upon the support 40 with the opening 46 in wheel 45 seeking the proper diameter of member 41 with its side-walls supportingly engaged by the same as in Figure 1. While this aligning is taking place, the bottom wall of wheel flange 45 rests and rides downwardly upon outer yielding cylindrical support 47.

Unless the tire and wheel or other annular member are prefectly balanced, it will be seen that member 40 will tip by the force of gravity upon its point support 32.

A corresponding tipping will take place in pointer 37 whose point 38 will no longer register with the target bull's-eye 27, but will be displaced therefrom to register with one of the indicating circles 28, 29 or 30, or points intermediate said circles on the target 25.

The greater the deflection of point 38, the greater in ounces will be the weight required in properly balancing the wheel, i. e., the weight to be secured to the rim of the wheel on the side thereof opposite to the direction of tilting.

It will be understood that the target 25 may be used for all wheel sizes or for all sizes of annular objects. On the other hand it is desirable that the particular target 25 be calibrated for a particular size of tire or wheel so that each of the concentric circles 28, 29 and 30 will designate the predetermined weight required to counteract the underbalance of the wheel. In other words, the center of gravity of most wheels is displaced from its geometric center; and the device herein described ascertains the amount of the weight required at the wheel rim to bring the wheel center of gravity back to its geometric center to thereby obtain a perfectly balanced wheel.

It will be understood that target 25 is removeable and may be replaced by other targets which have been pre-calibrated for any particular size of wheel.

It will be understood that it is also necessary to determine the exact positioning of the correcting weight around the 360 degrees of the circumference of the wheel rim or other annular object.

Due to the point support of supporting member 40, it will be seen that the same will tilt in the exact radial direction of the displaced center of gravity of the wheel around its 360 degrees of circumference. It is then only necessary to place a mark on the tire 180 degrees from the direction of tilt as indicated by the angular positioning of pointer 37 relative to the target bull's-eye 27.

This is the exact point on the rim, i. e., on the opposite side thereof on a radial line passing through the geometric center of the wheel. Thus the compensating weight required and its exact location at the periphery of the wheel rim can be accurately determined.

The balancing of the wheel can be double checked as the wheel when properly balanced will no longer tilt on its support 40, and the point 38 will align with the bull's-eye 27 of target 25.

Having described our invention, reference should now be had to the claims which follow for determining the scope thereof.

We claim:

1. A gravity tire and wheel balancer comprising a standard, an upright pointed bearing means on said standard, a wheel support centrally balanced on said pointed means, a pointer on said wheel support, a target support mounted upon said standard, a target arm pivoted thereon and adapted to assume a normally horizontal position, and a flat transparent horizontally arranged target carried on said arm and centrally mounted above said pointer and calibrated by a plurality of concentric circular markings to indicate the amount and direction of tilt of said wheel support when an unbalanced wheel is mounted thereon.

2. A gravity tire and wheel balancer comprising a standard, an upright pointed bearing means on said standard, a conically shaped wheel support centrally balanced on said pointed means, an upright pointer on said wheel support, a target support mounted upon said standard, a horizontally arranged target arm movably mounted upon said target support, and a flat transparent horizontally arranged target carried on said arm and adapted to be moved into and out of position centrally above said pointer, said target being calibrated by a plurality of concentric circular markings to indicate the amount and direction of tilt of said wheel support when an unbalanced wheel is mounted thereon.

RAY A. KOERTGE.
GEORGE E. PRESTON.

REFERENCES CITED

The following references are of record in the file of this patent:

UNITED STATES PATENTS

| Number | Name | Date |
|---|---|---|
| 609,395 | Atwood | Aug. 16, 1898 |
| 1,352,905 | Machrol | Sept. 14, 1920 |
| 2,110,343 | Taylor | Mar. 8, 1938 |
| 2,170,848 | Bennett | Aug. 29, 1939 |
| 2,270,657 | Kraft | Jan. 20, 1942 |
| 2,385,424 | Shue et al. | Sept. 25, 1945 |